Dec. 12, 1972   F. D. CHEW   3,706,538
SMOKE ABATEMENT APPARATUS
Filed Dec. 23, 1970
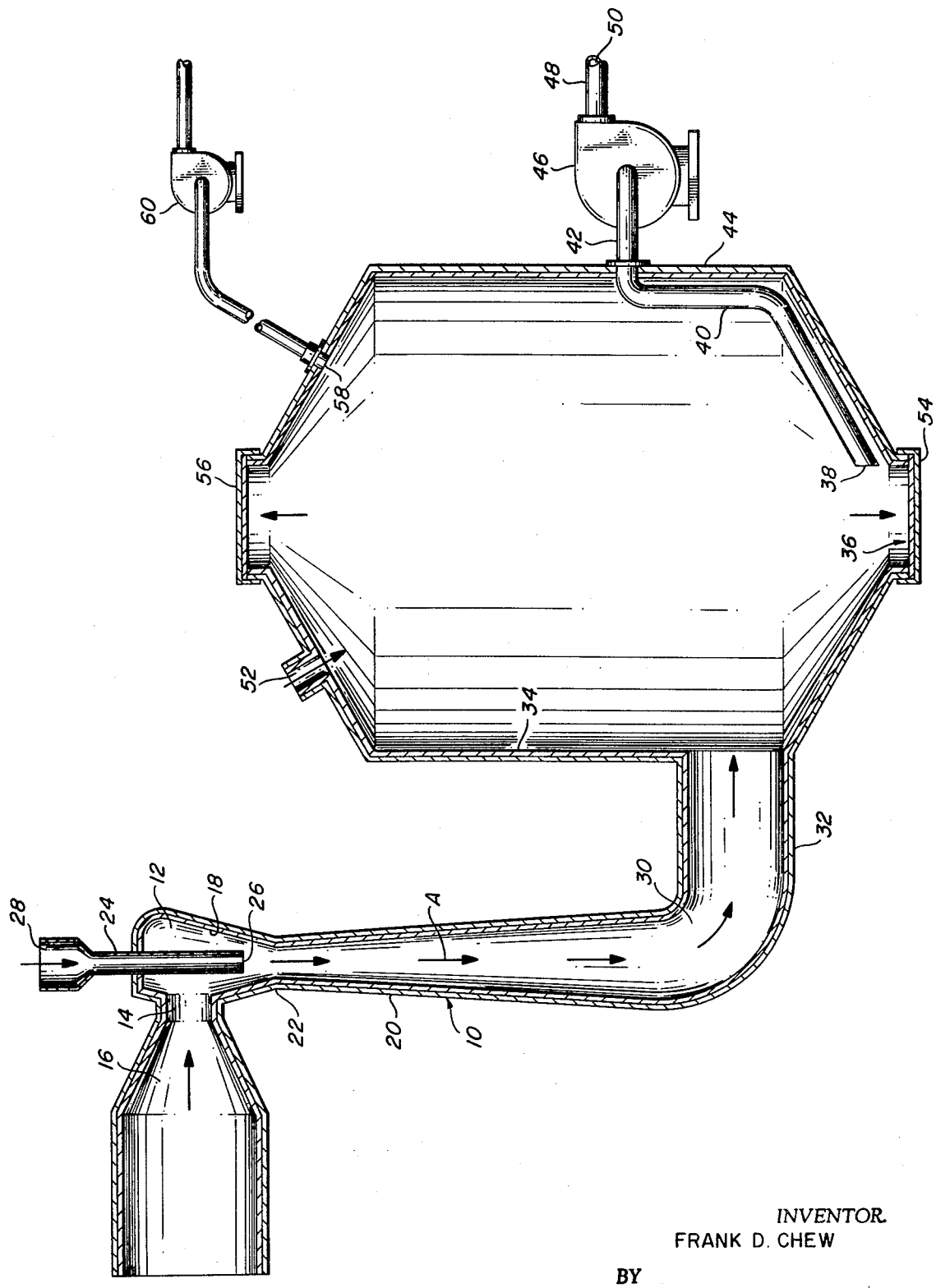
INVENTOR
FRANK D. CHEW
BY
Drummond & Phillips
ATTORNEYS

3,706,538
SMOKE ABATEMENT APPARATUS
Frank D. Chew, 4320 N. 63rd Ave., Phoenix, Ariz. 85033
Filed Dec. 23, 1970, Ser. No. 101,038
Int. Cl. B01j 1/20, 1/00; B01d 47/10
U.S. Cl. 23—284                                    4 Claims

ABSTRACT OF THE DISCLOSURE

A smoke abatement apparatus and method wherein smoke is introduced into the inlet of a converging diverging venturi while a nozzle emits a high velocity jet stream of wetting fluid into the converging inlet of said venturi to aspirate and scrub said smoke for emulsifying it during passage through said venturi; and wherein a tank communicates with the diverging outlet of said venturi to collect emulsified materials from said smoke; said venturi and said tank being provided with a lead interior to resist corrosive elements of said smoke; said apparatus also including means for admitting acidic or base materials, together with a foaming agent into said tank, for reaction with said base or acid materials of said smoke, said foaming agent also tending to collect non-condensables and/or non-soluble material from said smoke; exhaust pump means for removing said non-condensable and non-soluble materials from said tank; and another means adapted and disposed for pumping emulsified material and fluid from a lower sump portion of said tank.

---

Some smokes and/or gases are difficult to wet and emulsify due to the fact that they contain corrosive as well as non-combustible materials. Many such smokes are produced attendant to the smelting of various metals.

As an example, the smokes which are produced during the smelting of iron, aluminum, copper, zinc, lead and other metals may contain corrosive oxides and/or materials which are non-combustible and these materials are therefore oftentimes also very difficult to wet so that they may be emulsified. During the smelting or processing of various ores and/or metals, the fluxing process thereon causes some of the metals and particularly metal oxides to be carried away with smoke and/or gasses.

Such materials introduced into the atmosphere are detrimental to ecology and it is therefore recognized that efficient and economical means is required for the removal of such materials from smokes or gasses before they reach the atmosphere.

The abatement of smokes containing corrosive oxides and non-combustible materials has posed a serious economic problem relative to the smelting or processing of a great variety of materials. The economics being a problem not only due to the cost of apparatus for smoke abatement but also due to the maintenance of such apparatus under the highly corrosive action of some of the materials contained in various smokes and gasses.

In accordance with the present invention, smokes such as those containing non-combustible materials and corrosive materials may efficiently be emulsified in a converging diverging venturi structure wherein a nozzle emits a high velocity jet stream of wetting fluid into the converging inlet of the venturi to cause aspiration and scrubbing of smoke or gasses so as to emulsify them and to permit the emulsified materials to be collected in a tank and pumped therefrom with fluids to a suitable disposal or settling pond. The invention also comprises a converging diverging venturi scrubber structure and a collecting tank all provided with lead lining or interior surfaces adapted economically to resist the corrosive action of various materials carried by smoke being processed in the apparatus of the invention. Additionally, the invention comprises means for introducing caustic or acid materials together with a foaming agent for reacting with acidic or base materials respectively and for collecting non-condensables and non-solubles mechanically in foam within the tank so that the corrosive materials may chemically be reacted and the non-condensables and non-solubles may be mechanically collected in foam and subsequently removed from the tank and conducted to a suitable disposal area. The converging diverging venturi scrubber structure of the invention together with the lead lining therein and a lead lined tank provides for economical handling of the various smokes and/or gasses containing corrosive oxides and/or non-combustibles such as those carried by smokes emanating from areas where metals are smelted or refined.

The invention comprises means for removing emulsified materials and fluids from the sump of a collecting tank so that metal oxides or the like may be collected in the form of a mud in order that those having substantial value may be readily retrieved.

Accordingly, it is an object of the present invention to provide a smoke abatement apparatus and method which may be used economically to abate smokes and/or gasses in order to avoid damage to the ecology and to collect certain materials from such smokes or gasses which have some value.

Another object of the invention is to provide a very simple smoke scrubber comprising a converging diverging venturi into which smoke is aspirated and in which it is scrubbed by means of a high velocity jet stream of wetting fluid introduced into the converging, or inlet end of the venturi, and wherein a tank receives emulsified material from the outlet of the venturi; the venturi and tank being lead lined to efficiently handle corrosive materials.

Another object of the invention is to provide a novel venturi scrubber and collecting tank so disposed to receive caustic or acid material for reaction with acidic or base elements introduced into the tank from the scrubber and wherein a foaming agent may also be introduced into the tank for the collection of non-condensables and/or non-soluble material.

Another object of the invention is to provide a venturi scrubber and receiving tank wherein materials may be emulsified and collected respectively and wherein a sump pump is adapted to remove emulsified materials and fluids from the sump of the tank while an exhaust pump is adapted to exhaust foamed and/or non-condensable and non-soluble materials from the tank and to provide a pressure differential relative to the outlet of the venturi scrubber compatible with operational efficiency thereof.

Other objects and advantages of the invention may be apparent from the following specification, appended claims and accompanying drawings.

The figure of the drawing is a sectional diagrammatic view of a smoke abatement apparatus comprising a venturi scrubber and collecting tank as well as means for introducing materials and removing materials relative to the interior of the tank.

As shown in the figure of the drawing, the apparatus of the invention comprises a venturi structure 10 of substantially conventional converging diverging structural character. This venturi 10 is provided with an inlet chamber 12 adapted to receive smoke through an inlet 14 thereof from a smoke or gas conduit 16. The chamber 12 communicates with the interior of a converging portion 18 of the converging diverging venturi 10. This converging portion 18 forms a transition with a diverging portion 20 of the venturi at a restricted throat area 22 of the venturi structure 10.

A nozzle 24 extends into the chamber 12 and is provided with a fluid jet emitting end 26 adapted to direct a jet of high velocity high pressure wetting fluid toward the throat 22 of the converging diverging venturi 10. The nozzle 24 is provided with an inlet conduit 28 which is adapted to communicate with a high pressure liquid pump for pumping water into the nozzle 24 or the conduit 28 may communicate with a steam boiler or steam generator so that either water or steam may be conducted under high pressure through the conduit 28 and into the nozzle 24 so as to emit a high velocity jet of wetting fluid from the nozzle end 26 of the nozzle 24. The jet of wetting fluid is directed upstream of the throat 22 of the venturi 10 so as to aspirate smoke or other gasses from the conduit 16 into the venturi inlet 12 and to thereby force the smoke to be subjected to high velocity scrubbing in the venturi 10 so as to emulsify materials contained in or carried by the smoke. Such emulsification may occur during the high pressure and high velocity scrubbing of the smoke or gasses in the venturi structure which is provided with a flow axis indicated by arrows A in the drawing, this axis being directed generally downwardly through the venturi structure 10.

An example of the construction of the converging diverging venturi 10 is such that the total angle of the converging structure 18 may be approximately 21° and the total angle of the diverging portion 20 of the venturi 10 may be approximately 6°. This diverging portion of the venturi structure is substantially elongated as compared to the converging structure 18 and is directed downwardly for a substantial distance toward an elbow conduit structure 30, which communicates through a horizontal conduit structure 32, with the interior of a tank 34. This tank 34 is a collecting tank having a lower sump area 36 adapted to collect emulsified materials and communicating with the interior sump 36 is an open end 38 of a hollow pipe 40 having a portion 42 extending outwardly through a sidewall portion 44 of the tank 34. The pipe 40 is coupled to a pump 46 having an outlet 48 which is coupled to a conduit 50 which may be extended to a suitable pond in which emulsified materials may collect, such materials when settled in the pond, may be in the form of a mud such as wetted metal oxides or the like having substantial value.

In an upper portion of the tank 34 is an inlet means 52 adapted to admit caustic materials such as lime for reacting with the highly corrosive acidic materials carried by some smokes and this inlet 52 is also adapted to admit acid for reacting with some of the corrosive base materials carried by or contained in smoke.

The sump area 36 of the tank 34 is provided with a clean-out plate or door 54 adapted for use in cleaning the lower portion of the tank and a similar clean-out lid or door 56 is disposed in the upper part of the tank for convenience in obtaining access thereto and for cleaning the tank.

Communicating with an upper interior portion of the tank 34 is an exhaust conduit 58 communicating with an exhaust fan or blower 60 adapted to remove fluids or gaseous materials such as those containing non-soluble or non-condensible material.

The fan or blower 60 may be a pump suitable in CFM delivery to provide for a negative pressure condition in the tank so as to augment operation of the venturi 10 and to permit facility of induction of materials through the inlet 52 for neutralization of acidic or base materials in the tank 34.

The materials inlet 52 is adapted to permit the introduction of a foaming agent into the interior of the tank 34 so as to assist in the mechanical collection of various materials from smoke in the tank, some of such materials may be non-condensible and non-soluble.

The interior of the conduit 16, inlet chamber 12, converging and diverging venturi structures 18 and 20, elbow 30, conduit 32 and tank 34 as well as the conduit 40, may be made of lead so as to economically resist the corrosive acidic and base materials carried by smoke being processed by the apparatus of the invention. The lead lining for all of these structures is very economical and generally resistant to a great variety of corrosive elements contained in gasses or smokes.

In accordance with the method of the invention, smokes, such as aluminum oxychloride, or other previously mentioned smokes may be processed in the apparatus of the invention and the particles of smoke must be wet in order to be emulsified and such particles are very corrosive and abrasive. Consequently, the lead lining in the structure of the invention is economically and functionally important.

The smokes or gasses in accordance with the method of the invention are introduced into a converging diverging nozzle structure 10 of the invention and aspirated thereinto by a high velocity, high pressure jet stream of wetting fluid such as water or steam so as to cause violent scrubbing of the gasses in order to wet and emulsify the various materials such as the metal oxides or the like so that these are then capable of being conducted into the tank 34 and collected in the sump area 36 from which they are pumped by the pump in connection with the conduit 40. These metal oxides of substantial value may be collected in a sump or pond as desired.

The method of the invention also comprises the introduction of caustic or acid materials, into the tank 34, for reacting with acidic or base materials respectively, contained in the elements of the smoke or gasses being processed. Additionally, a foaming agent may be admitted through the inlet 52 so as to mechanically collect various materials such as the non-condensible and non-soluble materials which do not become emulsified in the venturi 10.

Concurrently, with the operation of the venturi 10, neutralizing materials may be induced through the opening 52 and during the introduction of foaming materials therein, the exhaust pump or fan 60 is operated so as to create a partial vacuum in the tank 34 and to withdraw gasses and/or materials such as foamed materials through the conduit 58 in order to remove non-condensible and non-soluble materials which may be mechanically contained in the foam or in gasses removed by the exhaust fan or pump 60.

It will be obvious to those skilled in the art that various modifications of the present invention may be resorted to without departing from the spirit thereof.

I claim:

1. In smoke abatement apparatus:
   (a) a vertical venturi comprising:
      (i) a converging inlet having an end wall and a tapered wall terminating at a restricted throat, and
      (ii) a diverging outlet connected to said inlet at said restricted throat;
   (b) a smoke conduit communicating at one end with an inlet port in the tapered wall of said converging inlet;
   (c) a high pressure fluid nozzle extending through the end wall of said converging inlet beyond said inlet port and having a nozzle end spaced from said restricted throat;
   (d) a horizontal conduit connected to the lower end of said diverging outlet;
   (e) a tank having a sump and connected to said horizontal conduit at a location immediately above said sump;
   (f) a pipe mounted in said tank and having an open end disposed in said sump;
   (g) an exhaust pump positioned externally of said tank and connected to said pipe;
   (h) an inlet for introducing a neutralizer for acidic or basic smoke ingredients and a foaming agent into the upper portion of said tank;

(i) an exhaust conduit connected to said tank at the upper portion thereof;

(j) a fan included in said exhaust conduit, and (k) a lead lining covering the inner surfaces of said venturi, said horizontal conduit and said tank.

2. The smoke abatement apparatus of claim 1 in which said smoke conduit is lined with lead.

3. The smoke abatement apparatus of claim 1 in which said sump is of frusto-conical shape and said tank mounted pipe extends over the inner face of said sump.

4. The smoke abatement apparatus of claim 1 in which the upper portion of said tank is frusto-conical in shape and includes said inlet for neutralizers and a foaming agent and to which said exhaust conduit is connected.

References Cited

UNITED STATES PATENTS

| | | | |
|---|---|---|---|
| 2,020,850 | 11/1935 | Myhren et al. | 261—DIG. 54 |
| 2,751,031 | 6/1956 | Smith et al. | 261—DIG. 54 |
| 2,937,141 | 5/1960 | Helwig | 261—DIG. 54 |
| 3,218,047 | 11/1965 | Calaceto | 261—DIG. 54 |
| 3,339,344 | 9/1967 | Pallinger | 261—DIG. 54 |
| 3,385,030 | 5/1968 | Letrin | 261—DIG. 54 |
| 3,406,953 | 10/1968 | Moore | 261—DIG. 54 |
| 3,448,562 | 6/1969 | Westing | 261—DIG. 54 |
| 3,574,562 | 4/1971 | Kawahata | 23—284 |

FOREIGN PATENTS

| | | | |
|---|---|---|---|
| 1,017,715 | 1/1966 | Great Britain | 261—DIG. 54 |

OTHER REFERENCES

Schulte and Koerting Co. (Cornwells Heights, Bucks County, Pa.) Bulletin 4R, January 1964.

BARRY S. RICHMAN, Primary Examiner

U.S. Cl. X.R.

23—2 R, 252 A, 285; 55—220; 261—DIG. 54